(12) United States Patent
Olvera-Hernandez et al.

(10) Patent No.: US 7,616,956 B2
(45) Date of Patent: Nov. 10, 2009

(54) MEASUREMENT REQUEST REPORT EXTENSIONS FOR MEDIA INDEPENDENT HANDOVER

(75) Inventors: Ulises Olvera-Hernandez, Kirkland (CA); Alan Gerald Carlton, Mineola, NY (US); Juan Carlos Zuniga, Montreal (CA)

(73) Assignee: InterDigital Technology Corporation, Wilmington, DE (US)

( * ) Notice: Subject to any disclaimer, the term of this patent is extended or adjusted under 35 U.S.C. 154(b) by 17 days.

(21) Appl. No.: 11/374,764

(22) Filed: Mar. 14, 2006

(65) Prior Publication Data

US 2006/0246904 A1 Nov. 2, 2006

Related U.S. Application Data

(60) Provisional application No. 60/662,121, filed on Mar. 15, 2005.

(51) Int. Cl.
*H04W 36/00* (2006.01)
(52) U.S. Cl. .................. 455/436; 455/439; 370/331
(58) Field of Classification Search ............... 455/67.11, 455/67.14, 423, 434, 435.2, 436–439, 513; 370/331–335, 241, 252, 253
See application file for complete search history.

(56) References Cited

U.S. PATENT DOCUMENTS

| 7,123,628 | B1* | 10/2006 | Hwang et al. ............... 370/469 |
| 2002/0082036 | A1 | 6/2002 | Ida et al. |
| 2006/0092864 | A1* | 5/2006 | Gupta et al. ............... 370/278 |
| 2006/0099948 | A1* | 5/2006 | Hoghooghi et al. ......... 455/436 |
| 2006/0166677 | A1* | 7/2006 | Derakshan et al. .......... 455/453 |

FOREIGN PATENT DOCUMENTS

WO 00/76233 12/2000

OTHER PUBLICATIONS

"Standardization of Handover between Heterogenous Networks and Related Technology," IT Standard Weekly No. 2005-01, Telecommunications Technology Association (Jan. 3, 2005).
Carlton et al., "Media Independent Handover Functions and Services Specification", IEEE 802.21 Media Independent Handover, Retrieved from http://ieee802.org/21/doctree/2005_meeting_docs/2005-01_meeting_docs/21-05-0203-00-0000-interdigital.doc, (Jan. 9, 2005).
Institute of Electrical and Electronics Engineers 802 Committee of the Institute of Electrical and Electronics Engineers Computer Society, *Draft Amendment to Standard for Information Technology—Telecommunications and Information Exchange Between Systems—LAN/MAN Specific Requirements—Part 11: Wireless Medium Access Control (MAC) and Physical Layer (PHY) Specifications: Amendment 7: Radio Resource Measurement*, IEEE Standard 802.11k/D1.4, Jan. 2005.

(Continued)

*Primary Examiner*—Jean A Gelin
(74) *Attorney, Agent, or Firm*—Volpe and Koenig, P.C.

(57) ABSTRACT

A method for generating a media independent handover (MIH) trigger in a wireless local area network begins by sending a measurement report request message to a measurement entity in the network. The measurement entity takes the measurements and sends a measurement report response message to a medium access control (MAC) function. The MAC function evaluates the measurements and determines whether a handover condition exists, based on the measurements. The MAC function generates a MIH trigger if the handover condition exists.

15 Claims, 3 Drawing Sheets

| CATEGORY | ACTION | DIALOG TOKEN | NUMBER OF REPETITIONS | MIH | MIH MEASUREMENT MODE | MEASUREMENT REQUEST ELEMENTS |
|---|---|---|---|---|---|---|
| 202 | 204 | 206 | 208 | 210 | 212 | 214 |

200

OTHER PUBLICATIONS

Institute of Electrical and Electronics Engineers 802 Working Group of the 802 Committee, *Draft Amendment to Standard for Information Technology—Telecommunications and Information Exchange Between Systems—Local and Metropolitan Networks—Specific Requirements—Part 11: Wireless LAN Medium Access Control (MAC) and Physical Layer (PHY) Specifications: Enhancements of Higher Throughput*, IEEE Standard 802.11n/D1.0, Mar. 2006.

LAN/MAN Standards Committee of the Institute of Electrical and Electronics Engineers Computer Society, *Supplement to IEEE Standard for Information Technology—Telecommunications and Information Exchange Between Systems—Local and Metropolitan Area Networks—Specific Requirements—Part 11: Wireless LAN Medium Access Control (MAC) and Physical Layer (PHY) Specifications: High-Speed Physical Layer in the 5 GHz Band*, IEEE Standard 802.11a-1999, Reaffirmed Jun. 12, 2003.

LAN/MAN Standards Committee of the Institute of Electrical and Electronics Engineers Computer Society and the Institute of Electrical and Electronics Engineers Microwave Theory and Techniques Society, *IEEE Standard for Local and Metropolitan Area Networks, Part 16: Air Interface for Fixed and Broadband Wireless Access Systems*, IEEE Standard 802.16-2004, Oct. 1, 2004.

LAN/MAN Standards Committee of the Institute of Electrical and Electronics Engineers Computer Society, *Draft IEEE Standard for Local and Metropolitan Area Networks: Media Independent Handover Services*, IEEE 802.21/D00.05, Jan. 2006.

\* cited by examiner

MEASUREMENT REQUEST REPORT EXTENSIONS FOR MEDIA INDEPENDENT HANDOVER

CROSS REFERENCE TO RELATED APPLICATION(S)

This application claims the benefit of U.S. Provisional Application No. 60/662,121, filed Mar. 15, 2005, which is incorporated by reference as if fully set forth herein.

FIELD OF INVENTION

The present invention generally relates to wireless local area networks (WLANs), and more particularly, to a mechanism for providing triggers to determine whether a handover should be executed.

BACKGROUND

In the study of Media Independent Handover (MIH), there are challenges regarding whether or not new procedures are required to trigger the generation of handover events from lower layers (i.e., MAC and PHY layers) as a means to initiate a handover process. Triggers are required in order to determine whether a handover should be executed. An example of a trigger could be the fact that the signal quality of a particular link layer connection has reached a preconfigured threshold indicating that the client station is approaching the fringe of a cell. There has been reluctance to introduce new trigger procedures. Existing handover processes are proprietary and rely on polling mechanisms to retrieve information from the lower layers and to make decisions.

There are no procedures or functionality to generate triggers to the upper layers that are based on state changes, which are characterized as values that cross thresholds previously set by a higher layer entity. In this case, the higher layer entity is the MIH function. Therefore, a method capable of generating these triggers is required.

SUMMARY

The present invention is a method and system for use in connection with the IEEE 802.21 standard to request measurements, in the form of events, in conjunction with existing Measurement Request and Measurement Report messages applicable to 802.11-based and 802.16-based networks. The invention takes advantage of the existing measurement mechanism that provides similar information, but does not generate triggers.

The invention provides a method to configure MIH triggers, using existing 802.11k and 802.16 procedures. The triggers are generated toward a higher layer in conjunction with generating measurement reports towards a peer. The triggers can also be generated independently of the peer-to-peer measurement reports, but uses the measuring capabilities from the underlying layers.

A method for generating a MIH trigger in a WLAN begins by sending a measurement report request message to a measurement entity in the network. The measurement entity takes the measurements and sends a measurement report response message to a MAC function. The MAC function evaluates the measurements and determines whether a handover condition exists, based on the measurements. The MAC function generates a MIH trigger if the handover condition exists.

A method for generating a MIH trigger in a WLAN includes the steps of determining whether a handover condition exists and generating the MIH trigger by a MAC function if the handover condition exists.

An apparatus for generating a MIH trigger in a WLAN includes a measurement device, a MAC device, and a MIH device. The measurement device is configured to take measurements in the WLAN. The MAC device is in communication with the measurement device, and is configured to generate a MIH trigger based on measurements taken by the measurement device. The MIH device is in communication with the MAC device and is configured to perform a handover upon receipt of the MIH trigger from the MAC device.

A communication frame for providing MIH information in a WLAN includes a MIH information field and a MIH measurement mode field.

BRIEF DESCRIPTION OF THE DRAWINGS

A more detailed understanding of the invention may be had from the following description of a preferred embodiment, given by way of example, and to be understood in conjunction with the accompanying drawings, wherein.

DETAILED DESCRIPTION OF THE PREFERRED EMBODIMENTS

Figure 1:
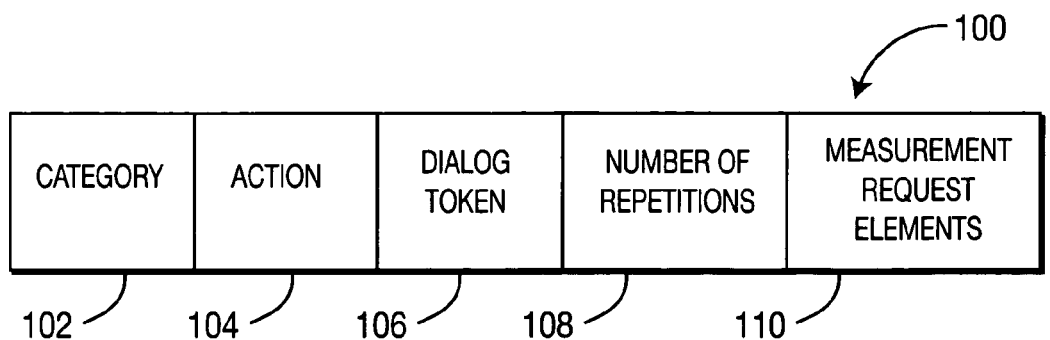
FIG. 1 is a diagram of an existing measurement request frame.

Hereafter, the term "station" (STA) includes, but is not limited to, a wireless transmit/receive unit (WTRU), a user equipment, a fixed or mobile subscriber unit, a pager, or any other type of device capable of operating in a wireless environment. When referred to hereafter, the term "access point" (AP) includes, but is not limited to, a base station, a Node B, a site controller, or any other type of interfacing device in a wireless environment.

The present invention can apply, but is not limited, to IEEE 802 technologies such as 802.11 baseline, 802.11a OFDM 5 GHz WLAN, 802.11b HR-DSSS 2.4 GHz WLAN, 802.11e QoS extensions (including WMM and WMM/2 brands), 802.11g OFDM 2.4 GHz WLAN, 802.11j OFDM 10 MHz option WLAN, 802.11k Radio Resource Measurement, 802.11n High-Throughput WLAN, 802.11s ESS Mesh, 802.11v Wireless Network Management, and 802.21 Media Independent Handover. The present invention also applies to cellular standards such as 3GPP and 3GPP2 and to standardized or proprietary wireless technologies similar to IEEE 802 WLANs, such as 802.15 Bluetooth, HIPERLAN/2, and so on.

The invention provides a method and system to configure Media Independent Handover (MIH) triggers, using existing 802.11k and 802.16 procedures. The triggers are generated toward a higher layer in conjunction with generating measurement reports towards a peer. The triggers can also be generated independently of the peer-to-peer measurement reports, but uses the measuring capabilities from the underlying layers.

The invention includes the use of triggers as a means to identify state changes that occur at the lower layers. The procedures that cause the states to change are addressed at a higher level. As an example, the invention includes sending notifications, also referred to as triggers, to an upper layer entity when there is a specific change in the lower layer based on configuration information provided by the upper layer. An example of a change in the lower layer is the capability of the lower layer to provide a predetermined minimum data rate, for example, 10 Mbits/sec. This assumes that the upper layer has the means to configure the lower layer in order to react to this change. Following this example, the lower layer would trigger an event notification as soon as the data rate provided by the lower layer falls below 10 Mbits/sec.

Furthermore, proprietary methods are also available to request measurements from lower layers using polling mechanisms. Polling mechanisms are not the preferred solutions as they lack the real time component that makes the measurement valuable, particularly when a handover is imminent. Using the above example, a higher layer polling mechanism has to request data rate information from the lower layer periodically and check whether the data rate requirement was met. This procedure has two primary disadvantages. First, the number of messages required to find out whether the state has changed can be considerable. Second, the time required to find out whether the state has changed could be longer since polling requires at least twice as many signals (one for each poll message and one for each response message) as triggering.

FIG. 1 is a diagram of an existing measurement request frame 100. The frame 100 includes a category field 102, an action field 104, a dialog token field 106, a number of repetitions field 108, and one or more measurement request elements 110. The category field 102 is set to a predefined value to indicate a radio measurement category. The action field 104 is set to a predefined value to indicate a measurement request. The dialog token field 106 is set by the STA sending the measurement request frame 100 to identify the particular request. The number of repetitions field 108 indicates the number of repetitions to be performed for each of the measurement request elements 110 in the frame 100. Each measurement request element 110 indicates what is to be measured.

In one embodiment, the invention uses automatic configuration of MIH handover parameters. This method is based on using existing Medium Access Control (MAC) management messages that are applicable to both 802.11 and 802.16. In this embodiment, the MIH parameters are added to the measurement request message as shown in FIG. 2.

Figure 2:
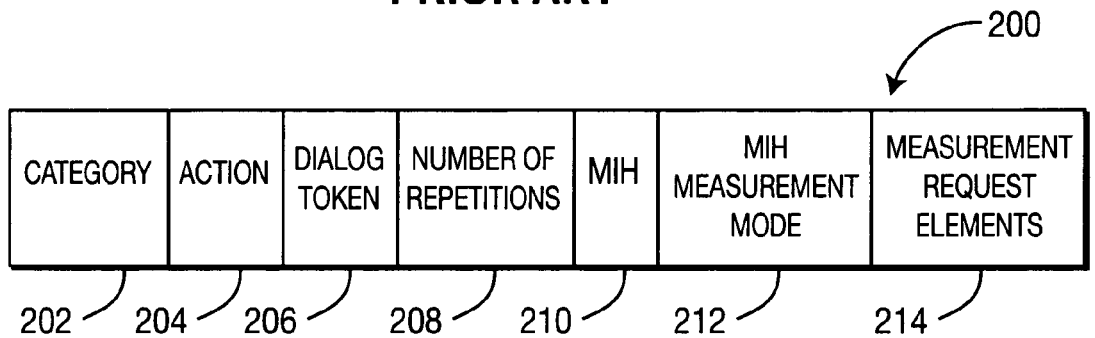
FIG. 2 is a diagram of a measurement request frame including MIH information.

FIG. 2 is a diagram of a measurement request frame 200 including MIH information. The frame 200 includes a category field 202, an action field 204, a dialog token field 206, a number of repetitions field 208, an MIH information field 210, an MIH measurement mode field 212, and one or more measurement request elements 214. Fields 202-208 are the same as fields 102-108 described above in connection with FIG. 1. The MIH information field 210 indicates that the measurement request message is used to configured parameters for the purpose of generating MIH events. The MIH measurement mode field 212 includes an identifier of the type of measurements that are to be performed. An example of the contents of the MIH measurement mode field 212 is shown in Table 1; this field can be expanded to include other measurement and reporting options. Each measurement request element 214 indicates what is to be measured and reported.

TABLE 1

MIH Measurement Mode Field

|  | MIH_B1 | MIH_B0 |
|---|---|---|
| No MIH Support | 0 | 0 |
| MIH Configuration is requested, measurements are aligned with peer Measurement Report | 0 | 1 |
| MIH Configuration is requested, measurements are aligned with peer Measurement Report. Measurement Request Elements apply only to MIH triggers | 1 | 1 |

It is noted that the specific allocation of bits within the message 200 may change. The invention specifically targets the use of these measurement messages as an alternative MIH configuration vehicle and as a means to access measurement capabilities in the lower layers.

Figure 3:
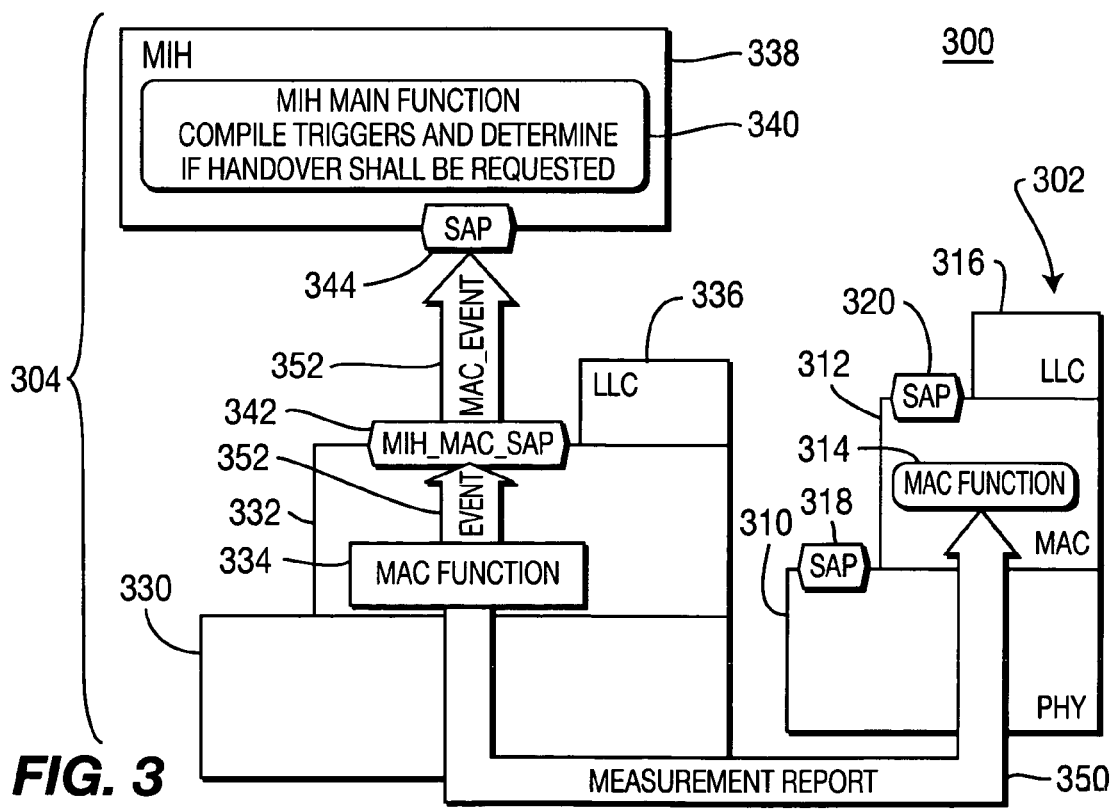
FIG. 3 is a diagram of a system configured for synchronized trigger generation and measurement report generation.

FIG. 3 is a diagram of a system 300 configured for synchronized trigger generation and measurement report generation. The system 300 includes a STA 302 and a WLAN node 304. The WLAN node 304 can include any type of 802.11 or 802.16 node that is capable of housing MIH functionality. The STA 302 includes a physical layer 310, a MAC layer 312 with a MAC function 314, and an LLC layer 316. A first service access point (SAP) 318 connects the physical layer 310 and the MAC layer 312, and a second SAP 320 connects the MAC layer 312 and the LLC layer 316.

The node 304 includes a physical layer 330, a MAC layer 332 with a MAC function 334, an LLC layer 336, and a MIH layer 338 including a MIH function 340. A MIH MAC SAP 342 and a SAP 344 connect the MAC layer 332 with the MIH layer 338.

In the embodiment shown in FIG. 3, the node 304 makes the measurements, and the MAC function 334 generates a measurement report 350 which is sent to the STA 302. The MAC function 334 also generates an event 352 if the measurements indicate that a handover should occur. The event 352 is forwarded to the MIH MAC SAP 342 and then from the MIH MAC SAP 342 to the SAP 344, where it is processed by the MIH function 340.

If the measurements are made at the STA 302, then the measurement report 350 is sent from the MAC function 314 in the STA 302 to the MAC function 334 in the node 304 (the arrow for the measurement report 350 in FIG. 3 would be reversed). The MAC function 334 will then evaluate the measurement report to determine whether to trigger an event 352.

As shown in FIG. 3, the MIH trigger generation (event 352) is synchronized with measurement reports 350. This addresses the specific case when events are triggered toward upper layers, and in particular towards the MIH layer 338 in conjunction with a measurement report message 350 generated toward the MAC peer entity 314. The event 352 is triggered from upper layers and the measurement report 350 can be generated simultaneously.

It is noted that the handover trigger event 352 can be generated by the MAC function 334 without the presence of the measurement report 350. The event 352 can be triggered based on internal monitoring by the node 304 or periodically. It is also noted that one skilled in the art can envision various other ways to generate a handover trigger event 352. There are generally three modes of operation when reporting measurements; the STA is configured for a particular operation mode. One mode is to send measurements towards peer entities (e.g., other STAs or an AP) and send triggers towards the MIH function simultaneously. A second mode is to send the triggers towards the MIH function when the measurements are available. A third mode is to report the measurements towards the peer entities (i.e., when the MIH bit is turned off).

Figure 4:
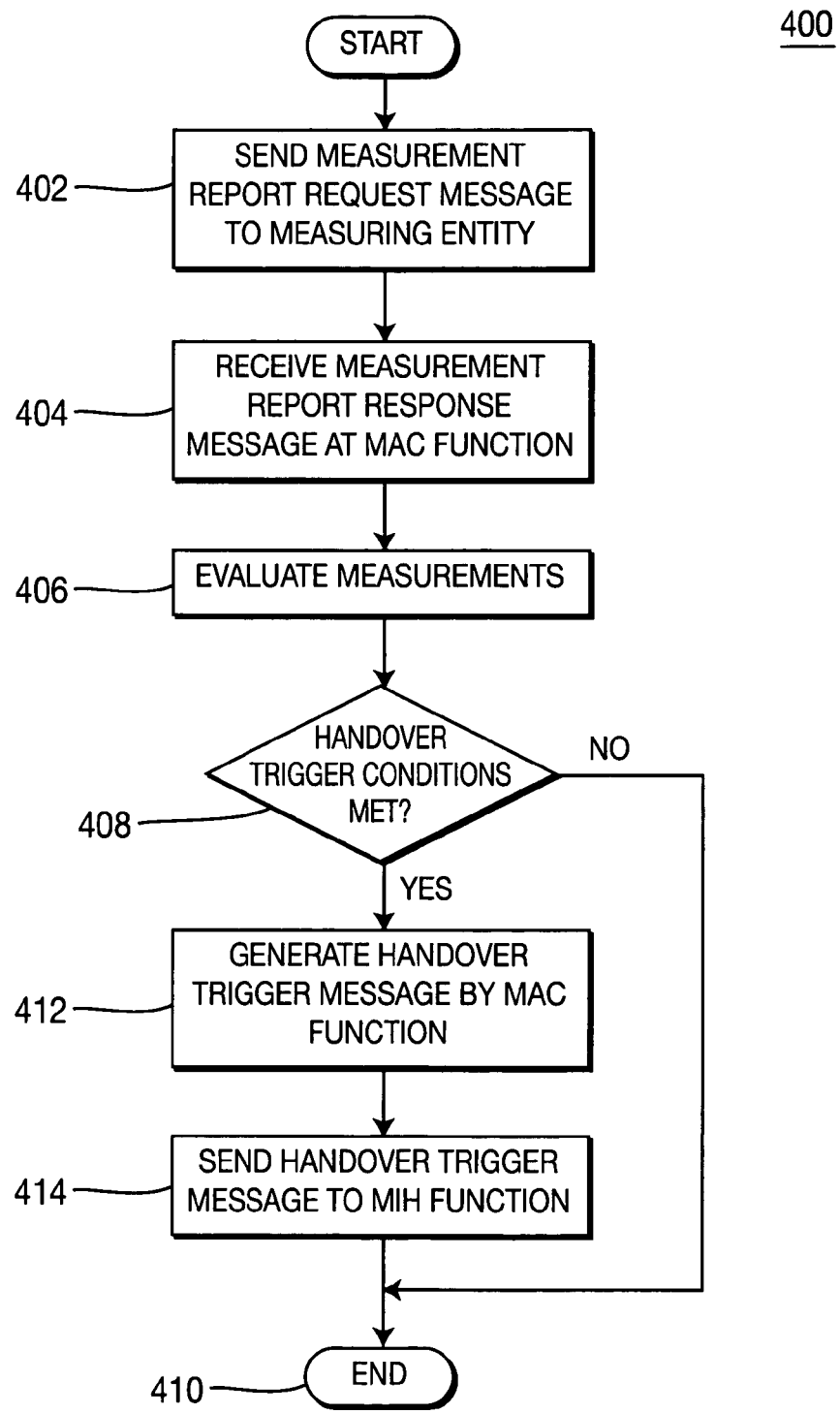
FIG. 4 is a flowchart of a method for synchronized trigger generation and measurement report generation.

FIG. 4 is a flowchart of a method 400 for synchronized trigger generation and measurement report generation. The method begins by sending a measurement report request message to a measuring entity in the WLAN (step 402). The measurements are made by the measuring entity and a measurement report response message is sent by the measuring entity and received by the MAC function in the WLAN node including the MIH functionality (step 404). The MAC function evaluates the measurements (step 406) and determines whether the handover trigger conditions are met (step 408). If the handover trigger conditions are not met, then the method terminates (step 410).

If the handover trigger conditions are met (step 408), then the MAC function generates a handover trigger message (step 412). The MAC function sends the handover trigger message to the MIH function (step 414) and the method terminates (step 410).

In an alternate embodiment of the method 400, the measurement report messages are not sent, and the method begins at step 408 with the MAC function making a determination whether handover trigger conditions are met.

Figure 5:
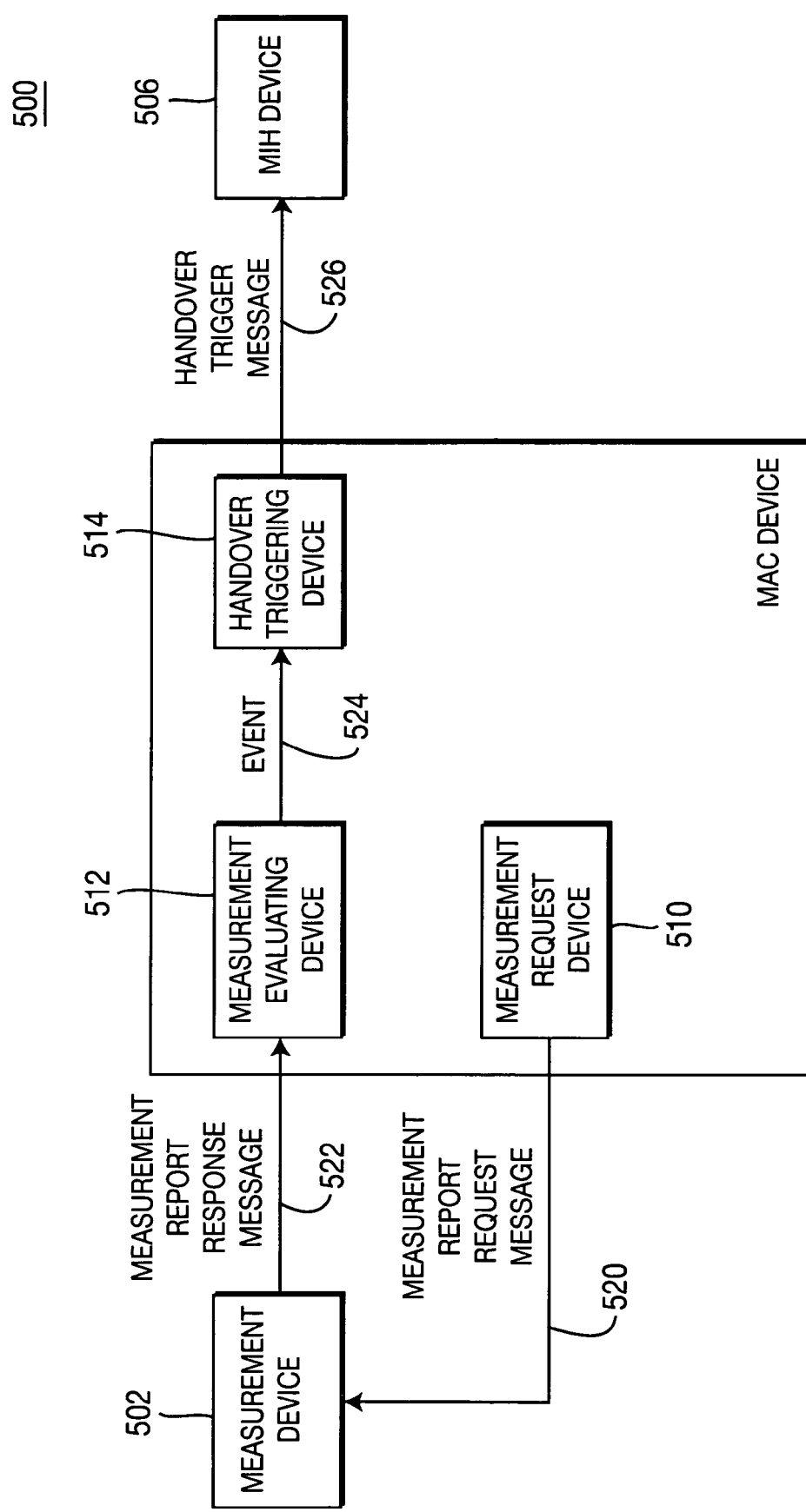
FIG. 5 is a diagram of an apparatus for synchronized trigger generation and measurement report generation.

FIG. 5 is a diagram of an apparatus 500 for synchronized trigger generation and measurement report generation. The apparatus 500 includes a measurement device 502, a MAC device 504 in communication with the measurement device 502, and a MIH device 506 in communication with the MAC device 504. The MAC device includes a measurement request device 510, a measurement evaluating device 512, and a handover triggering device 514.

In operation, the measurement request device 510 sends a measurement report request message 520 to the measurement device 502. The measurement device 502 takes the requested measurements and sends a measurement report response message 522 to the measurement evaluating device 512. The measurement evaluating device 512 evaluates the measurements and determines whether a handover is required. If a handover is required, the measurement evaluating device generates an event 524, which is passed to the handover triggering device 514. The handover triggering device 514 sends a handover trigger message 526 to the MIH device 506, which proceeds to execute the handover.

Although the features and elements of the present invention are described in the preferred embodiments in particular combinations, each feature or element can be used alone (without the other features and elements of the preferred embodiments) or in various combinations with or without other features and elements of the present invention.

What is claimed is:

1. A method for generating a media independent handover (MIH) trigger, comprising:
    sending a measurement report request message to a measurement device, the measurement report request message including a MIH information field, a MIH measurement mode field, and a plurality of measurement requests;
    in response to sending a measurement report request message, receiving a measurement report response message at a medium access control (MAC) function, the measurement report response message including a plurality of results of the plurality of measurement requests;
    determining whether a handover condition exists at the MAC function, based on the plurality of results; and
    generating a MIH trigger by the MAC function if a handover condition exists.

2. The method according to claim 1, further comprising:
    sending the MIH trigger to a MIH function to execute a handover.

3. The method according to claim 2, wherein the MIH function and the MAC function are located in the same node.

4. An apparatus for generating a media independent handover (MIH) trigger, comprising:
    a measurement device configured to receive a measurement report request message and take measurements, the measurement report request message including a MIH information field, a MIH measurement mode field, and a plurality of measurement requests;
    a medium access control (MAC) device in communication with the measurement device, the MAC device configured to generate a MIH trigger based on a plurality of results of the plurality of measurement requests; and
    a MIH device in communication with the MAC device, the MIH device configured to perform a handover upon receipt of the MIH trigger.

5. The apparatus according to claim 4, wherein the measurement device is configured to send a measurement report message including a plurality of results of the plurality of measurement requests.

6. The apparatus according to claim 4, wherein the MAC device is configured to send the measurement report request message.

7. The apparatus according to claim 4, wherein the MAC device includes:
    a measurement request device in communication with the measurement device;
    a measurement evaluating device in communication with the measurement device; and
    a handover triggering device in communication with the measurement evaluating device and the MIH device.

8. The apparatus according to claim 7, wherein the measurement request device is configured to send the measurement report request message to the measurement device.

9. The apparatus according to claim 8, wherein the measurement device is configured to send the measurement report message to the measurement evaluating device.

10. The apparatus according to claim 7, wherein the measurement evaluating device is configured to evaluate the measurement report message, to generate an event if the measurement report message indicates that a handover condition exists, and to send the event to the handover triggering device.

11. The apparatus according to claim 10, wherein the handover triggering device is configured to send a handover trigger message to the MIH device upon receipt of the event.

12. The method according to claim 1, wherein the MIH information field includes an identifier of a type of handover to be performed.

13. The method according to claim 1, wherein the MIH measurement mode field specifies the type of measurements to be performed.

14. The apparatus according to claim 4, wherein the MIH information field includes an identifier of a type of handover to be performed.

15. The apparatus according to claim 4, wherein the MIH measurement mode field specifies the type of measurements to be performed.

* * * * *